US009241245B2

(12) United States Patent
Lou et al.

(10) Patent No.: US 9,241,245 B2
(45) Date of Patent: Jan. 19, 2016

(54) MANAGEMENT OF UNWANTED CALLS AND/OR TEXT MESSAGES

(71) Applicant: Apple Inc., Cupertino, CA (US)

(72) Inventors: Wenping Lou, Beijing (CN); Wen Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 436 days.

(21) Appl. No.: 13/741,834

(22) Filed: Jan. 15, 2013

(65) Prior Publication Data

US 2014/0199975 A1    Jul. 17, 2014

(51) Int. Cl.
*H04W 4/16* (2009.01)
*H04W 4/00* (2009.01)
*H04L 29/06* (2006.01)
*H04W 12/08* (2009.01)

(52) U.S. Cl.
CPC .............. *H04W 4/16* (2013.01); *H04L 63/101* (2013.01); *H04W 4/001* (2013.01); *H04W 12/08* (2013.01)

(58) Field of Classification Search
CPC ..... H04W 4/12; H04W 88/184; G06Q 20/04; G06Q 30/06; G06Q 10/00; H04L 12/581; H04L 12/5815; H04L 12/5835; H04L 29/06; H04L 51/04; H04L 67/02; H04L 69/329
See application file for complete search history.

(56) References Cited

U.S. PATENT DOCUMENTS

| 8,412,779 | B1 * | 4/2013 | Qian ............................ 709/206 |
| 8,548,447 | B1 * | 10/2013 | Kirchhoff et al. ............. 455/415 |
| 8,630,393 | B2 * | 1/2014 | Baril et al. ................. 379/88.19 |
| 8,913,994 | B2 * | 12/2014 | Edwards et al. .............. 455/411 |
| 2005/0226151 | A1 | 10/2005 | Fotta et al. |
| 2011/0294478 | A1 | 12/2011 | Trivi et al. |
| 2012/0106728 | A1 | 5/2012 | Ghaffari et al. |
| 2012/0151578 | A1 | 6/2012 | Niemela |
| 2014/0235204 | A1 * | 8/2014 | Nieves .......................... 455/410 |

* cited by examiner

*Primary Examiner* — Diane Mizrahi
(74) *Attorney, Agent, or Firm* — Sterne, Kessler, Goldstein & Fox P.L.L.C.

(57) ABSTRACT

Management of unwanted phone calls and/or text messages can be performed by allowing a user to create a personalized list of unwanted calls and/or text messages at the user's device and synchronizing that personalized list between a storage system in the user's device and a remote storage in a network to which the device can be coupled. In one embodiment, the remote storage can be a cloud based backup system for the user's contacts and content and the user can access a full list of the unwanted phone numbers through a web server but the full list is not accessible on the device except through a web browser that retrieves the full list from the web server.

17 Claims, 9 Drawing Sheets

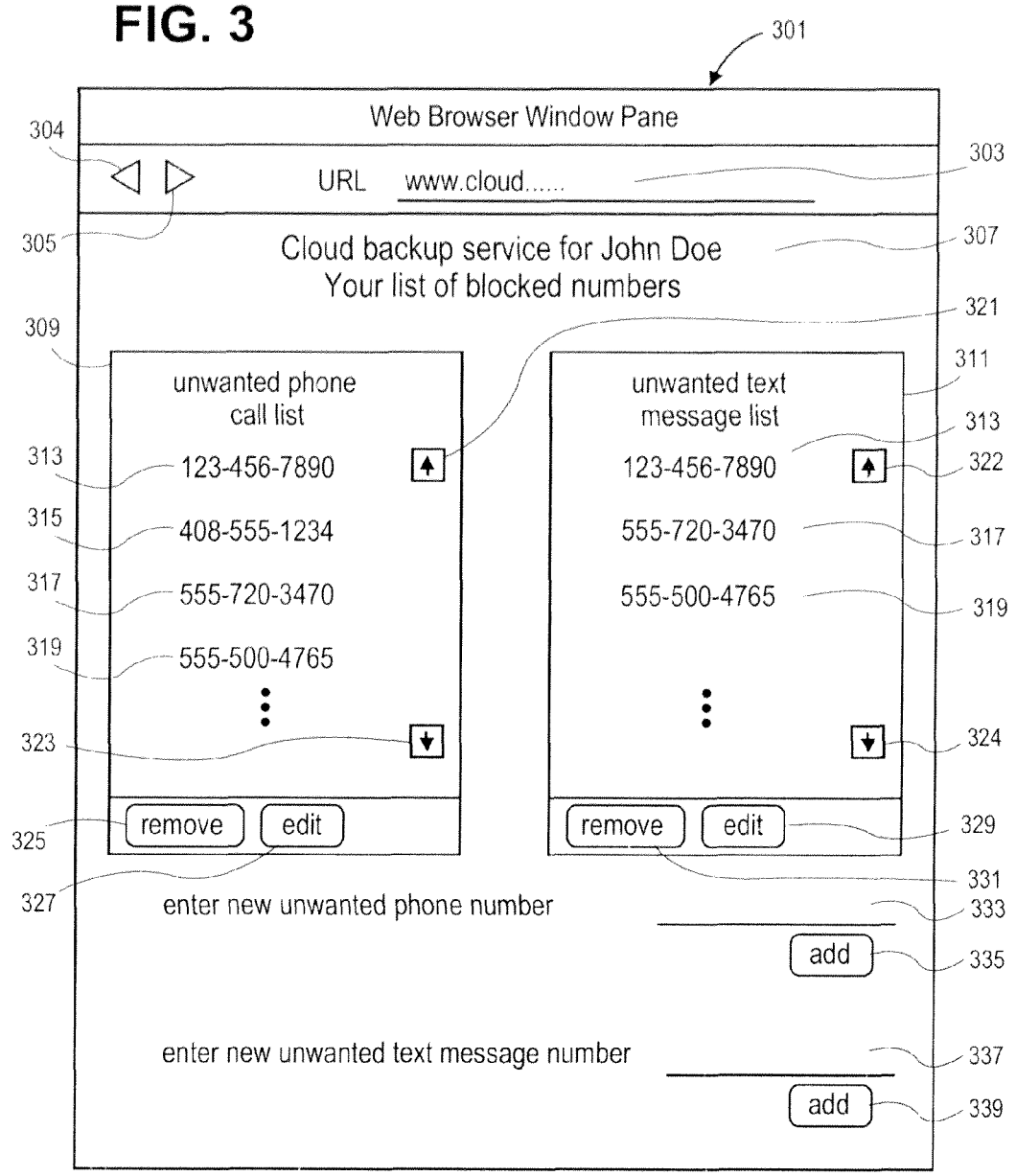

MANAGEMENT OF UNWANTED CALLS AND/OR TEXT MESSAGES

TECHNICAL FIELD

The features described herein relate to systems for managing phone calls and text messages, such as text messages provided through a short message service (SMS) provided by cell phone carriers.

BACKGROUND

Users of telephones often receive unwanted phone calls. For example, a user of a telephone may receive a marketing telephone call or a telephone call from a public opinion survey service or even a phone call from an ex-friend. Caller ID will alert the user to the call being unwanted by identifying the caller in many cases, but the telephone will still ring or otherwise provide an audible or other alert indicating that a call is incoming. Similarly, a user of a telephone device, such as a cell phone, may receive text messages through an SMS service, and some of these text messages can be unwanted, such as spam text messages or text messages from an ex-friend, etc. A typical cell phone will provide some alert (e.g. make a sound) when a text message is received even if it is an unwanted text message.

Certain solutions have been created for dealing with these unwanted phone calls. In these solutions, a mobile user can manage at the mobile device, such as a cellular telephone, a blocked list, also known as a "blacklist". The user manages this blocked list by providing inputs at the mobile device to add or change or delete numbers entered into the blocked list at the mobile device. In this solution, the entire management of the list is performed at the mobile device and this requires a complicated user interlace at the mobile device. Moreover, the list cannot be reused when the user upgrades to a new mobile device, such as a new cellular telephone. In other words, the list cannot be reused for the new device of the user when the user replaces the older cell phone. Moreover, there may be potential security risks with the management of a local blocked list at the mobile device.

SUMMARY OF THE DESCRIPTION

One embodiment described herein provides a cloud based storage and synchronization service of a blocked list (also known as a blacklist) for unwanted phone calls and/or text messages, such as text messages provided through a short message service (SMS). In this embodiment, as a user uses a phone or other device and indicates unwanted calls or text messages, a list is built at the phone, based on those inputs which indicated the unwanted calls or text messages, and that list is synchronized with a copy of the list maintained at a storage system in a network's infrastructure. The cloud based storage and synchronization can be provided by one or more servers coupled to a network's infrastructure, such as the infrastructure provided by a cellular telephone network or by other vendors which can provide such services through their network or networks which can be coupled to cellular telephone networks and other networks, such as the Internet. The infrastructure in one embodiment can recommend an initial blacklist which can be synchronized to the phone or other mobile device to create an initial list at the user's phone. In one embodiment, the list as a whole at the phone or other mobile device is not viewable as a full list and is not editable as a full list except through a web browser at the phone or mobile device which receives a web page from a web server having a synchronized copy of the user's personalized blocked list. Rather, the list can be viewed and edited, as a whole, full list on a web browser that displays a web page containing the list. The web browser could be running on a desktop computer that is distinct from the phone or other mobile device which is receiving inputs to add or change the blocked list at the mobile device. In other words, the list can, as a whole list, be viewed and edited through the cloud through another device (other than the phone or mobile device) and the list that cannot be viewed or edited as a list on the phone or mobile device except through a web browser on the phone or mobile device. Any changes made through the list through the cloud will be copied to the phone when the phone synchronizes with the list maintained at the storage system, and any changes made at the phone's list will be copied to the list in the cloud in this same synchronization, in one embodiment. Also in one embodiment, the list in the cloud can be shared with other users, and the user can reuse this list when upgrading to a new phone (thereby replacing the older phone) by synchronizing the new phone with the remote list stored in the cloud.

Another aspect of this description relates to how the phone or other mobile device can circumvent charges for unwanted text messages. Some cell phone carriers currently charge for all text messages even if they are not wanted as long as they have been received by the phone or other mobile device. If the source of text messages is on the list at the phone or other mobile device, the text message will be received. The phone or other mobile device, in one embodiment of the present invention, can prevent the user from being charged by breaking from the SMS protocol by not acknowledging receipt of the unwanted SMS message. In this way, the user will not be charged for unwanted text messages.

In one embodiment, a cellular telephone or other mobile device can perform a method which includes: receiving, at the device, one or more inputs from a user, each of the inputs indicating that the user does not want to receive a communication which is one of (a) a phone call or (b) a text message through a short message service (SMS); and in response to the inputs, adding identifiers to a local blocked list stored at the device, the local blocked list being personalized by the end user of the device and the identifier specifying one or more phone numbers (or other identifiers) to be blocked; and synchronizing the local blocked list stored at the device with a remote blocked list for the user stored at a remote storage in a network, wherein the synchronizing includes transmitting items on the local blocked list, including identifiers corresponding to the inputs, to the remote storage. In one embodiment, the remote blocked list is viewable and editable through a web browser on another device in order to allow the user to modify items in the remote blocked list which can then be synchronized again with the local blocked list on the mobile device. In one embodiment of this method, the local blocked list cannot be viewed, as a list of a plurality of phone numbers or other identifiers, at the device except through a web browser which obtains the list of a plurality of phone numbers from a web server which has access to the remote blocked list and which provides the list in a web page from the web server. In one embodiment, the method can further include receiving, at the device, a text message from a source device having an identifier, such as a phone number, on the local blocked list and failing, at the device, to acknowledge receipt to the SMS network of the text message that was received from the source device, the failing to acknowledge being in response to determining that the source device has an identifier on the local blocked list for unwanted text messages. The method can also include, in one embodiment, synchronizing the remote blocked list of the user with an additional local blocked list of the user stored on an additional device of the user, the additional local blocked list having identifiers, after the synchronizing, that specify one or more phone numbers to be blocked at the additional device of the user; the additional device can be a new device for the user which replaces the prior device used by the user. In one embodiment, the method can also include sharing, through an authorization provided by the user, the remote blocked list of the user with other users. The method can also include synchronizing the user's content, such as contacts, calendars, email, and media content (such as songs, videos, photos, etc.) with the remote storage device which acts as a backup storage of the user's content, such as contacts and media content.

A cloud based system, such as a server or set of servers in one or more networks can perform a method in conjunction with the mobile device to provide for a cloud based synchronization and/or backup service. In one embodiment, such a system can perform a method which includes storing a remote blocked list at a storage system in the network, the remote blocked list being personalized by a user of a mobile device, such as a cellular telephone, through one or more inputs from the user at the device, each of the inputs indicating that the user does not want to receive a communication which is one of a phone call or a text message; and the method can also include synchronizing, at the storage system, the remote blocked list at the storage system with a local blocked list stored at the device, the synchronizing comprising receiving, from the device, identifiers that specify one or more phone numbers to be blocked. In one embodiment, the remote blocked list is viewable and editable on another device through a web browser on that device which retrieves a web page from one or more servers having access to the remote blocked list; the list is presented in its full form through the web page even though, in one embodiment, the full list is not available at the mobile device of the user except through a web browser which also receives the same web page. In one embodiment, the method can also include synchronizing the remote blocked list with more than one mobile device of the user, such as an additional local blocked list of the user which is stored on an additional device of the user. In one embodiment, that additional device of the user can be a new cell phone or mobile device which is replacing the prior device of the user, thereby allowing the user to reuse the personalized local blocked list which had been synchronized with the remote blocked list. The method can also include sharing, through an authorization by the user, the remote blocked list of the user with other users. Also, in one embodiment, the method can include synchronizing the user's content, such as contacts, calendars, email, media content (e.g. songs, movies, books, magazines, etc.) and other content of the user with the remote storage system which acts as a backup storage of the user's content, such as contacts and media content.

In one embodiment, one or more service providers (such as a cell phone carrier or a device maker) can perform a statistical analysis on data from blocked lists to determine the most popular blocked phone callers or sources of spam/unwanted text messages. This statistical analysis can use the synchronized data in the remote blocked lists of a set of users, and the analysis can determine the most popular or common blocked callers and/or sources of unwanted text messages based on, for example, a calculated frequency that a particular caller is on the remote blocked lists of the set of users. The calculated frequency can be, for example, a simple ratio (e.g., 800 blocked lists, out of 1,000 blocked lists had caller 123-456-7890), and a certain number of phone numbers with the highest ratios can be included in a default or recommended blocked list. The set of users can be all (or a subset) of users that have synchronized their local blocked list with their remote blocked list. One or more default or recommended blocked lists can be created based on this statistical analysis and then provided by the service provider to users. The service provider (or other entities) repeatedly can update over time the default or recommended blocked lists as the set of users update their local blocked lists and as those updated local blocked lists are synchronized with their remote blocked lists; further statistical analysis can be performed on those synchronized remote blocked lists to provide the updated default or recommended blocked list(s). These one or more updated default or recommended blocked lists can be automatically, without user request, be pushed to the set of users (which could be a set of users in a geographic region who have agreed to allow their remote blocked lists to be mined for the purpose of creating one or more default blocked lists). The set of users can be based on a geographic region; for example, the data processing systems of a service provider can collect geographic related information (and/or other information) when synchronizing the local and remote blocked lists and this geographic information can be used to create geographically relevant default or recommended blocked lists for users in a geographic area. Users in Seoul, South Korea can have a different default or recommended blocked list than users in Las Vegas, Nev. and one or more service providers can use the geographic information to create the different geographically relevant default or recommended blocked lists. Hence, a new user in Seoul, South Korea would receive a default or recommended blocked list which is different than a default or recommended blocked list for a new user in Las Vegas, Nev. Similarly, updated default or recommended blocked lists can be different for different geographic regions so that existing (not new) users will receive different default or recommended blocked lists.

In one embodiment, one or more service providers can dynamically push (to one or more users' devices) a keywords list of common or frequently occurring words in spam text messages, and this keywords list can be used as a spam filter of text messages by identifying potential spam text messages which contain one or more words in the keywords list. In one embodiment, the keywords list can be user customizable by allowing each user to view and edit the user's keywords list through a web browser.

This description also describes devices which perform one or more of the methods described herein, and also describes machine readable non-transitory storage medium which store or contain computer program instructions which when executed by a system cause the system to perform one or more of the methods described herein.

The above summary does not include an exhaustive list of all embodiments. All systems and methods that can be practiced from all suitable combinations of the various embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 3 shows an example of a user interface of a web browser displaying the web page which provides access to a user of the user's personalized remote blocked list maintained by a system in a network.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of the embodiments of the present inventions.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
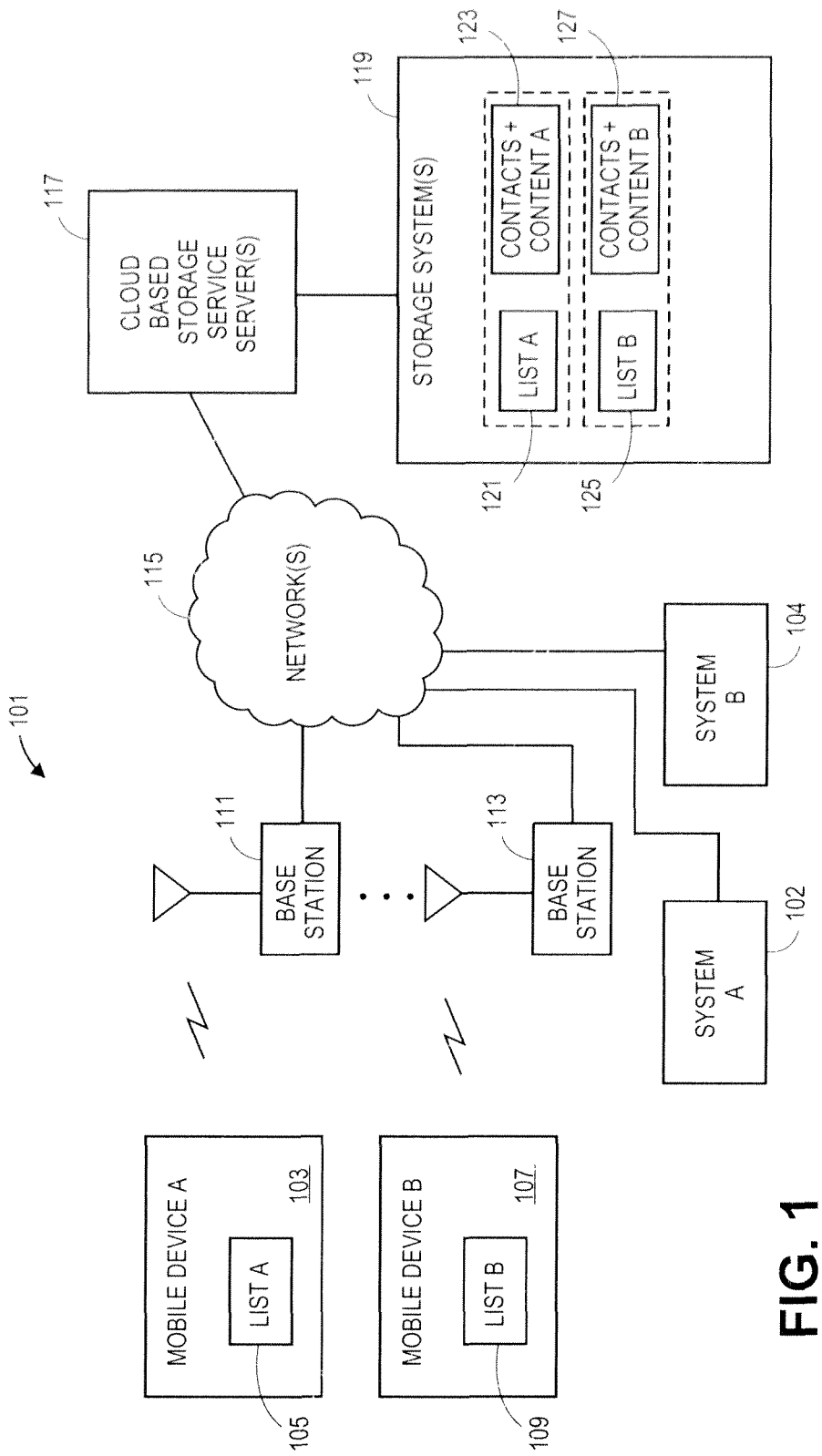
FIG. 1 shows an example of a cloud based system which can provide for the synchronization of a plurality of blocked lists, each of which is personalized for a user of a mobile device.

FIG. 1 shows an example of a cloud based system for providing the synchronization of a personalized blacklist or personalized blocked list. The system 101 can include a plurality of mobile devices, such as mobile device 103 and 107 which may each be a cell phone (e.g., an iPhone) or a tablet computer (e.g. an iPad with or without a cell phone transceiver) or other mobile devices which can access one or more networks 115 through one or more access points, such as base stations 111 and 113. In one embodiment, base stations 111 and 113 are cell phone towers which are coupled to the one or more networks 115. The base stations 111 and 113 can be operated by cell phone carriers to provide cell phone service to the mobile devices 103 and 107. In another embodiment, base stations 111 and 113 can be WiFi access points which are coupled to one or more networks, such as one or more networks 115. In another embodiment, a plurality of different types wireless access points can be used including WiFi access points. WiMax access points, and traditional cell phone towers to provide for a variety of wireless interfaces to mobile devices of different types. The networks 115 can be a plurality of networks, such as the Internet and also include a standard switched network such as the POTS, etc. A cloud based storage service 117 can be provided by one or more servers 117 which are coupled to the one or more networks 115. The one or more servers 117 can be coupled to one or more storage systems 119 which provide storage for remote blocked lists for a plurality of users, each remote blocked list being personalized or customized by the corresponding user using one or more of the methods described herein. The cloud based system 101 can include a plurality of systems, such as system 102 and system 104 which include web browsers that can obtain web pages from the one or more servers 117, each web page providing a list of blocked phone numbers or other identifiers for a particular user. The web page represents a list of the remote blocked list, and FIG. 3 shows an example of a user interface presented by a web browser operating on, for example, system 102 or system 104. In one embodiment, system 102 can be a desktop or laptop computer system or tablet computer operated by user A who uses mobile device 103. User A can use system 102 to retrieve a web page (from the one or more servers 117) that contains the remote blocked list for user A which is represented as list 121 on storage system 119. Similarly, user B can use system 104, which also can be a desktop computer or a laptop computer or a tablet computer, having a web browser allowing user B to access the remote blocked list 125 which represents user B's list of unwanted phone calls and text messagers.

As user A operates mobile device 103, the user can provide inputs which indicate phone numbers which are unwanted and text messages which are unwanted which can be specified by, for example, the phone number of the sender of the text message. In other embodiments, other identifiers can specify the source of a text message, and these other identifiers may include an email address along with other information indicating the source of the text message which the user wants to block. List A 105 represents user A's blocked list or local blocked list for user A which is stored on mobile device 103, and this list can be created over time as the user provides inputs indicating that certain calls are unwanted and certain text messages are unwanted. Over time, list A 105 is synchronized with list A 121 on storage systems 119. Similarly, user B while using mobile device 107 can build list 109, which is a personalized local blocked list for user B as user B uses mobile device 107. Over time, the list B 109 can grow as the user B indicates certain calls are unwanted and certain sources of text messages are also unwanted. List B 109 is over time synchronized with list B 125 at the storage systems 119 in the manner described further below. In one embodiment, user A can view and edit list A 105, in its last synchronized version only through the user of a web browser which retrieves a web page from a web server having access to the remote blocked list 121 on storage system 119. Similarly, user B in one embodiment has access to the full blocked list 109, in its last synchronized version, only through a web browser which retrieves a web page from a web server that provides the remote blocked list 125 which indicates the state of list B 109 as it existed at the end of the last synchronization operation in which list B 109 was synchronized with list B 125 in the manner described herein. The web browser can be a web browser on system 104 or a web browser on mobile device 107.

It will be understood that each of the lists 105 and 107 represent personalized lists for each user such that the lists will be different over time. For example, user A may indicate as unwanted certain calls from ex-friends, such as an ex-boyfriend or ex-girlfriend, etc. Similarly, user B will have a different set or list of unwanted calls based upon the personal requirements or desires of user B.

The storage systems 119 can store a remote blocked list for each user that uses the service provided by the one or more cloud based storage service servers 117. Hence storage system 119 can include potentially thousands of remote blocked lists, each personalized by the user of that list and, in addition the storage systems 119 can include content for each user which can also be personalized content, which can include, for example, contact or address book information, calendar information, and other personalized user content including, for example, music, videos, books, magazine subscriptions, email, etc. This information can be also synchronized between storage on the corresponding mobile device and storage on the storage system 119. For example, user A has his or her contacts and other content 123 storage on storage system 119 and this storage is also synchronized with the corresponding storage on mobile device 103 for the corresponding content, such as contacts and other content for user A. The content 123 can be synchronized at the same time that list A 121 is synchronized with list A 105. In this manner, content 123 can provide a backup storage system for user A should mobile device 103 fail in some way and lose some or all of its content on mobile device 103. Similarly, user B can use storage system 119 as a backup storage for user B's content by storing user B's contacts and other content onto storage system 119 through one or more synchronization processes, which can be the same synchronization process which synchronizes list 125 with list 109 for user B. For example, user B's content on storage system 119 can include user B's contacts, calendar, email, bookmarks, web browsing history, documents, music, video, books, magazine subscriptions, etc. Content 127 represents an example of the synchronized content for user B, and content 127 also represents a backup storage of user B's content which can be retrieved and stored on mobile device 107 should mobile device 107 need to be restored to a prior condition as a result of a device failure in which some or all of user B's content is lost. Moreover, the content of each of the users can be used to initialize a new system which is an upgrade for a user from a prior system by retrieving the user's content from storage system 119 and by retrieving the remote blocked list; in this manner, a user can easily initialize and configure a new device which is an upgrade from a prior device by retrieving user's content as well as the blocked list from storage system 119.

In one embodiment, each of the local blocked lists may be a single list containing phone numbers or other identifiers which specify both unwanted phone calls and unwanted text messages. This single list can block phone calls or text messages from the same phone number, and thus it does not matter whether the source sends a text message or makes a phone call in either case it will be blocked. In another embodiment, each local blocked list can in fact be two separate lists, one for unwanted phone calls and another for unwanted text messages. In this alternative embodiment, it is possible for a user to specify that phone calls from a particular phone number are to be blocked but text messages from that same phone number are not to be blocked or vice versa. In this manner, the user has the ability to permit one type of communication to be permitted (not blocked) while another from the same source is not permitted (blocked). Where two separate lists are used, these two separate lists will be synchronized such that they will be present both at the mobile device and at the storage system, such as storage system 119. For example, if list A 105 is in fact two separate lists then list A 121 will also be two separate lists, one for unwanted phone calls and one for unwanted text messages.

Figure 2A:
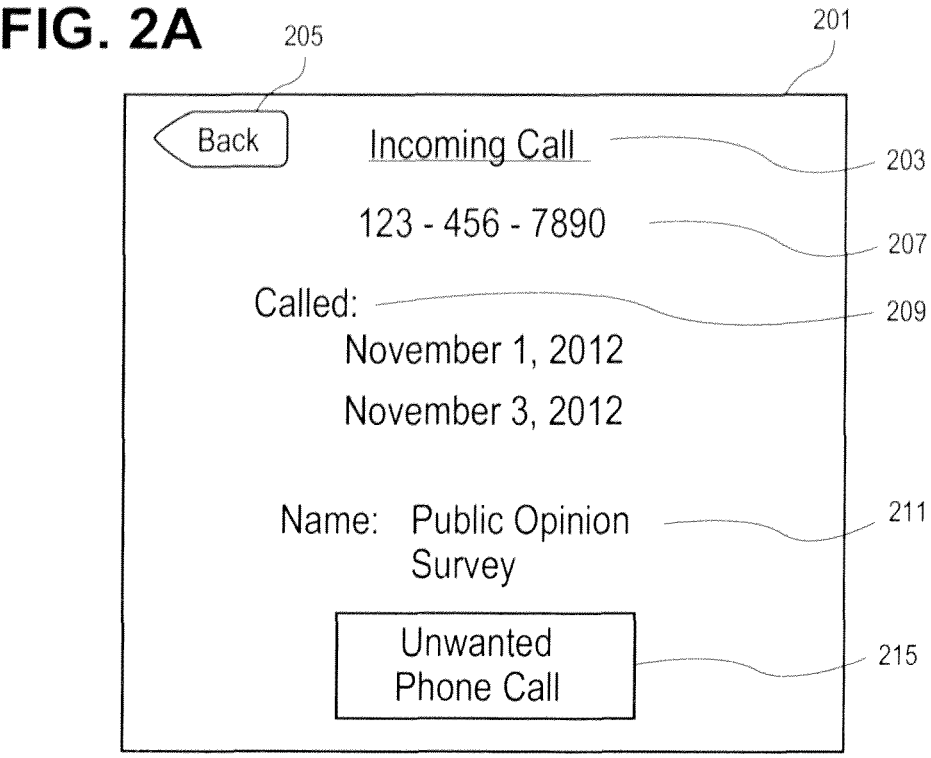
FIG. 2A shows an example of a user interface on a mobile device, such as a cellular telephone.

FIG. 2A shows an example of a user interface which can be presented on a mobile device, such as mobile device 103 or 107. This user interface can include a view 201 which can be a window or a pane displayed on a display of a mobile device 103 or 107. The view 201 can include one or more input regions, such as button 215 or button 205 which allow a user to invoke a particular command or option as is known in the art. It will be appreciated that more user commands may also be displayed as buttons or other user selectable options or icons as is known in the art. For example, view 201 can be similar to an incoming call view that is displayed on an iPhone to indicate that an incoming call is being received. This can be shown by heading 203 which indicates that the view 201 shows that a call is incoming from phone number 207. Alternatively, view 201 can represent information about a received incoming call and can include a list of recently received calls 209. View 201 can also include a name associated with the number 207 which indicates the source of the call, in this case an entity or name known as "public opinion survey". If the user of the mobile device, such as a cell phone does not want to receive future phone calls from this phone number, the user can select input option 215 to indicate to the system that the call is unwanted so that in the future it will be blocked by adding that identifier, such as phone number 207 for the caller to the local blocked list. It will be appreciated that further additional information may be provided in the view 201 with respect to phone number 207 or less information may be provided depending upon the particular embodiment. Back button 205 allows the user to go back to the prior screen which may be the incoming call log shown in view 220.

Figure 2B:
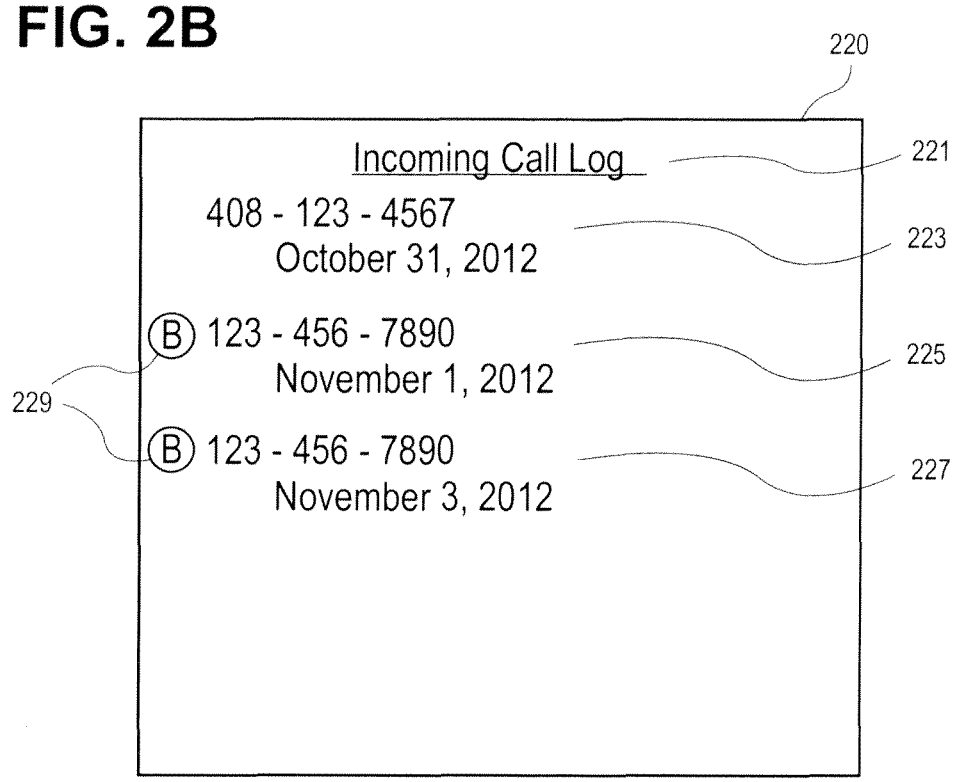
FIG. 2B shows an example of a user interface for an incoming call log on a mobile device, such as a cellular telephone (also referred to as a cell phone).

FIG. 2B shows an example of a user interface which presents an incoming call log 221 in view 220. This log can be similar to a log of calls, whether answered or not, except that it can now include one or more indicators for calls that are blocked based upon an identifier for the call being stored in a local blocked list which is used to decide whether or not a call is blocked. In one embodiment, when a call or text message is blocked, the cell phone or other mobile device does not create a ring or other sound and does not otherwise provide an alert, such as a vibration or other indication that the call or text message was received. Thus, the phone is in one embodiment totally silent and does not reveal that a particular blocked call has been received or a particular text message has been received. Rather, the blocked call or text message is entered into a log of blocked calls or a log of incoming calls or a log of received text messages without alerting the user. The blocking of a phone call or text message is based upon an identifier, such as a phone number being stored in the local blocked list. It will be appreciated that if the user has updated the remote blocked list and the local blocked list has not been synchronized with the updated remote blocked list then a phone number recently added to the remote blocked list will still be received and will not be blocked by the local blocked list until the local blocked list is synchronized with the remote blocked list to add the new number on the remote blocked list to the local blocked list. Incoming log 221 in view 220 can include a plurality of phone numbers such as number 223 and number 225 which is also shown as being received on a separate date as indicated by number 227. Numbers 225 and 227 include indicators 229 to show that they are on the local blocked list and hence will be blocked as described herein. Instead of or in addition to indicators 229, phone numbers 225 and 227 can be shown in a different color or with other different indicia or indicators to indicate that they are on the local blocked list. It will be appreciate that more information or less information can be shown in view 220 as is known in the art and that more user commands can be made available within the incoming log 221 within the view 220 as is known in the art.

It will be appreciated that there are numerous ways to allow a user to provide an input to indicate that a particular phone call or text message is unwanted and that FIG. 2A represents one example of such a user interface and that alternative user interfaces may be utilized to provide such indication that an incoming call is unwanted or an incoming text message is unwanted.

Figure 2C:
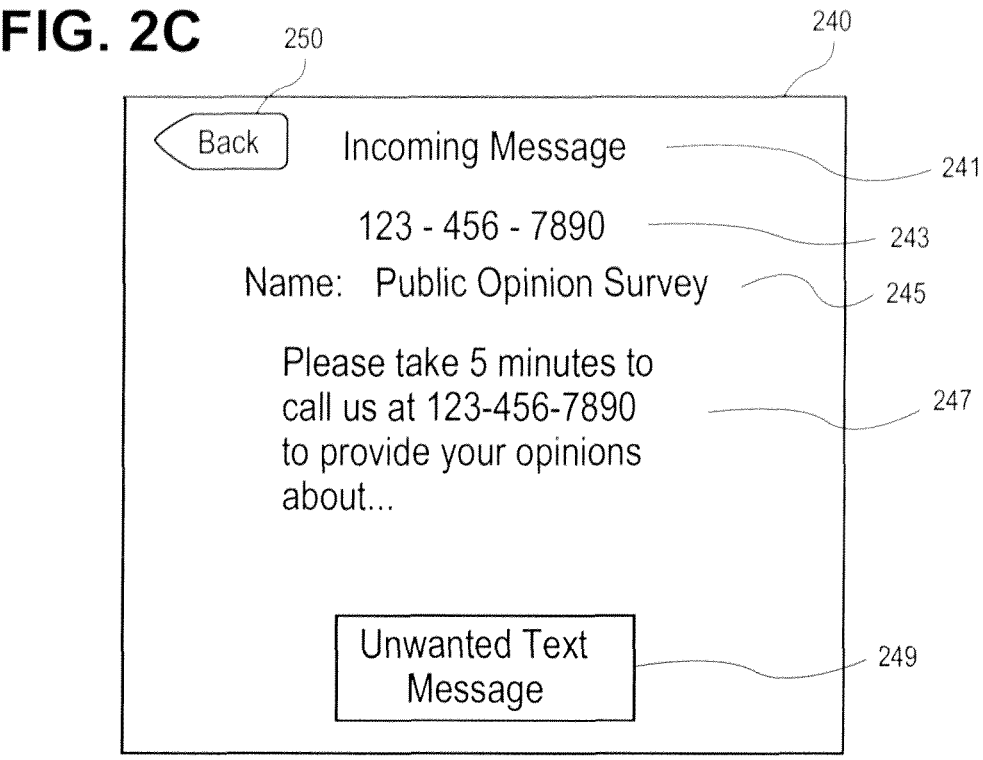
FIG. 2C shows an example of a user interface for an incoming text message on a cell phone.

FIG. 2C shows view 224 which includes a pane for incoming messages 241. The pane shows that an identifier, such as phone number 243 for the incoming text message and also shows a name associated with the incoming text message, name 245 indicating that the source of the text message is from "public opinion survey". In addition, the incoming message shown in view 240 can include at least a portion of the text message 247. In one embodiment, the text message is received by the mobile device which presents the view 240 but the mobile device does not follow the SMS protocol because it does not acknowledge receipt of the received SMS message because the SMS message is from a source on the blocked list of text messagers. When a user receives a particular text message that the user does not want to receive, the user can select the input region 249 on the device to cause the device to store one or more identifiers, such as phone number 243 to indicate that text messages from that source are unwanted. In one embodiment, the phone number 243 is entered into one or more lists of unwanted communications. In one embodiment, a mobile device and remote storage system can maintain separate lists, one for unwanted phone calls and one for unwanted text messages, such that a user can allow phone calls to be unblocked and text messages to be blocked from a particular phone number or vice versa.

Figure 2D:
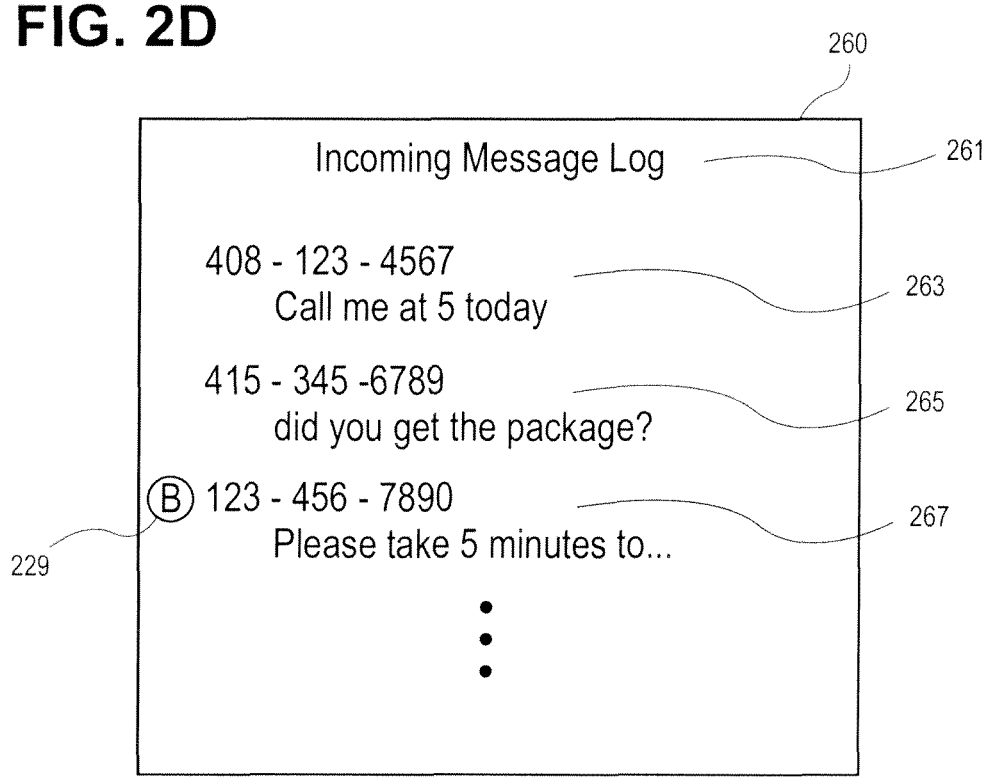
FIG. 2D shows an example of a user interface for an incoming text message log according to one embodiment.

FIG. 2D shows an example of a user interface displaying a view 260 containing an incoming message log 261 which represents a log of incoming text messages. It will be appreciated that other information or more information or less information can be displayed within view 260 and that additional user commands may also be displayed within view 260. Incoming message log 261 includes a display of three different phone numbers 263, 265, and 267 along with at least a portion of the received text message from each of those three phone numbers. In the case of phone number 267, the user has selected to place that phone number on the local blocked list (for example, by selecting input region 249 within view 240). Indicator 269 indicates that that phone number 269 has been placed on the blocked or unwanted text message list which can be maintained in one or more local blocked lists on the mobile device which displays the view 260. Instead of or in addition to indicator 269, the phone number 267 can be displayed in different colors or with a different font or other different appearances to indicate that it has been placed on the blocked or unwanted text message list.

FIG. 3 shows an example of a web browser user interface which can present one or more unwanted communication lists maintained by a remote storage system and these lists are provided to the user through a web server which provides the web page displayed by the web browser on the user's system, such as system 102 or system 104. In one embodiment, the full list of blocked phone numbers or other identifiers is not viewable or editable at the mobile device, such as mobile device 103 or 107 except for the use of a web browser on the mobile device which accesses the web page provided by a web server, such as a webserver which is part of server system 117. Window pane 301 can include one or more lists, such as list 309 and 311 which respectively show an unwanted phone call list and an unwanted text message list. The web browser window shown in FIG. 3 can include conventional web browser user interface elements, such as a back button 304 and a forward button 305 as well as a URL text entry field or a URL indicator field which indicates the URL of a currently viewed web page or which is an input field to enter a URL for a web page. URL text entry field 303 can be displayed next to the back and forward buttons in one embodiment. The web page also includes an optional title 307 which indicates that this is the backup cloud service for a particular individual and in particular shows that it is displaying the list of blocked numbers or other identifiers for that particular user. In the embodiment shown in FIG. 3, the list of unwanted phone numbers and the list of unwanted text messages sources exceeds the available space of each list and so each list includes scroll controls, such as scroll up controls 321 and 322 and scroll down controls 323 and 324 to allow a user to scroll up and down through the list to see the entire list of unwanted communications currently stored on the remote blocked list for that user. Each list 309 and 311 also includes user controls to allow a user to remove an identifier, such as a phone number, from the list or to otherwise edit the number within the list. In particular, list 309 includes a remove command 325 and an edit command 327 which respectively allow a user to remove a phone number from the unwanted phone call list 309 or to edit a particular phone number which has been selected by the user within the unwanted phone call list 309. Similarly, unwanted text message list 311 includes remove command 331 and edit command 329 which respectively allow a user to remove or edit a particular selected phone number or other identifier for a text message source in the text message list 311. The web browser window pane 301 also includes two text entry fields 333 and 337 which allow a user to enter a new unwanted phone number or a new unwanted text message number respectively, into the corresponding lists 309 and 311 respectively. In one embodiment, the user enters a particular phone number in one or both fields 333 and 337 and then selects one or both of the add buttons 335 or 339 in order to cause the phone number to be added to the respective list. For example, if a user wants to enter a new unwanted phone number but not to enter that number into the text message number field 337 then the user would enter the phone number into the text entry field 333 and select the add button 335 without also entering that same number into text entry field 337. In this way, the user has decided to cause that phone number to be entered into the unwanted phone call list 309 without also entering that same phone number into the unwanted text message list and hence text messages from that phone number will not be blocked while phone calls from that phone number will be blocked. An example of this scenario exists with respect to number 315 in which phone calls from that number are blocked but text messages from that number 315 are not blocked as indicated by the difference between the list 309 and the difference 311. Phone calls or text messages from the other numbers 313, 317, and 319 will both be blocked for phone calls as well as text messages. The embodiment shown in FIG. 3 uses two separate lists for phone calls and text messages; in an alternative embodiment, one list for both phone calls and text messages could be used, and in this case, phone calls or text messages from the same phone number are blocked as a default whether the communication from that phone number is a phone call or a text message.

Figure 4:
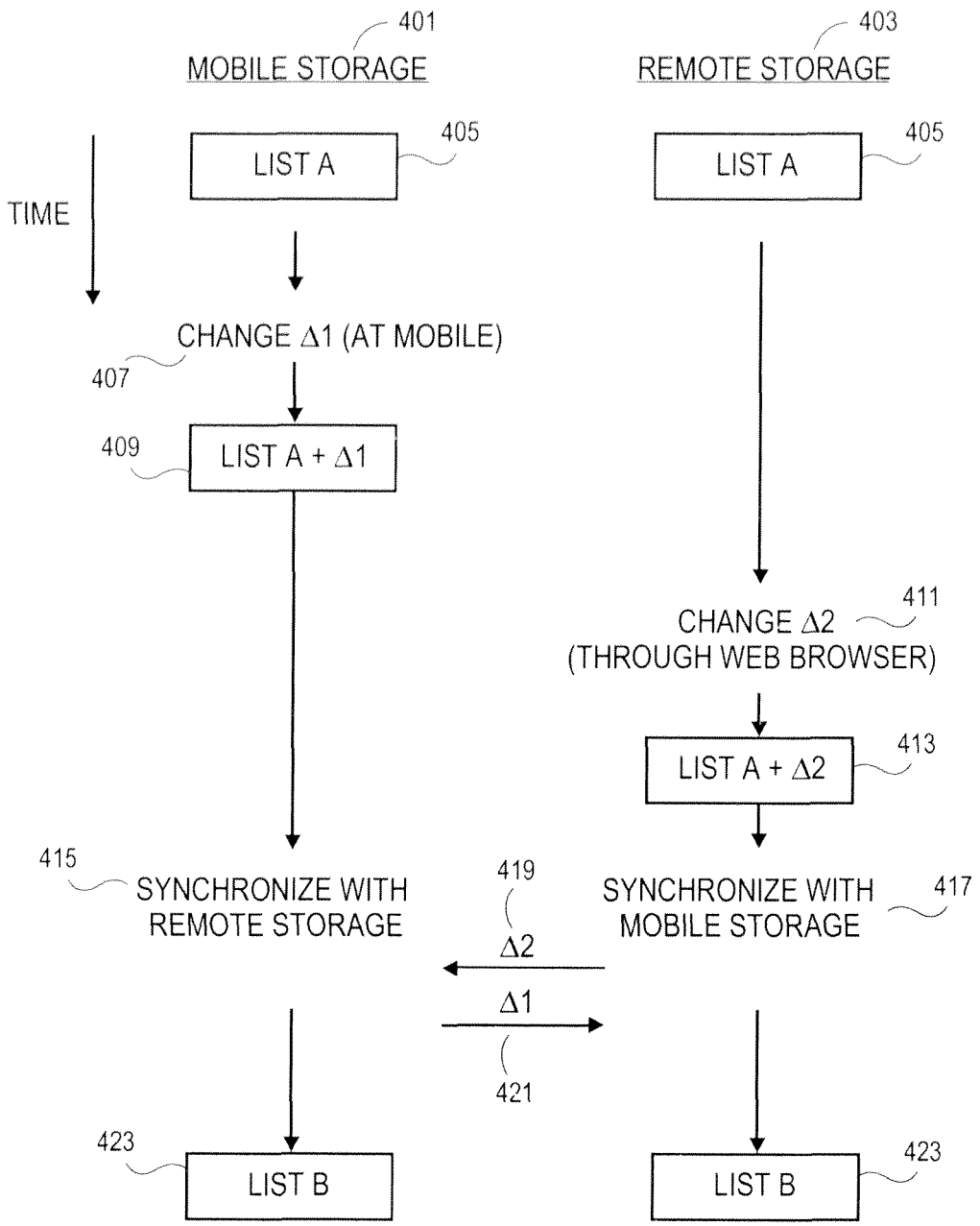
FIG. 4 shows a synchronization process over time between a mobile storage and a remote storage, each of which were synchronized over time.

FIG. 4 shows an example over time of how a local blocked list is synchronized with a remote blocked list which is maintained at a remote storage. In particular, a local blocked list in mobile storage 401 is synchronized over time with a remote blocked list at remote storage 403 in the exemplary manner shown in FIG. 4. Initially, list A is the same at both mobile storage and remote storage and is represented as list A 405 on both storage 401 and 403. This can occur after a synchronization which is not shown in FIG. 4 at a time which is prior to the time shown in FIG. 4. Then, the user can use the mobile device to make changes to the list, such as change 407 which can represent the addition of a new phone number or a new text message source which is to be blocked. Alternatively, this change can represent an editing of a phone number at the mobile device or the deletion of a phone number at the mobile device to allow the phone number to be unblocked. The result of change 407 creates a revised list 409 which shows list A as well as the change 407. At this point in time, no synchronization has been performed and thus there is, at this point in time in FIG. 4, a difference between the remote blocked list and the local blocked list. Next, at a later time, the user edits the remote blocked list by making change 411 which is different than the change 407. This change 411 is performed by a user using a web browser to access a web page which contains the information of the user's remote blocked list as it exists since the last synchronization between the local blocked list and the remote blocked list. This change 411 can be entered through a web browser as shown in FIG. 3 to create a change to one or both of the phone call list 309 and the text message list 311 or to single list as in an alternative embodiment described above. Change 411 results in a change to the remote blocked list which results in list 413 which includes list A and the change 411 which can be different than the change 407. At this point, the local blocked list differs from the remote blocked list in that local blocked list has change 407 while remote blocked list has change 411 which can be different from the change 407. At the next synchronization point, the mobile storage 401 is synchronized in operation 415 with remote storage 403 which synchronizes in operation 417 with the mobile storage. This can involve transmitting the change 411, shown as operation 419 to the mobile device while the mobile device transmits change 407, shown as operation 421 to the remote storage 403. After the synchronization, the lists at both the mobile storage 401 and the remote storage 403 are the same, shown as list 423. The synchronization can be performed on user command in one embodiment or it can be performed on a mobile device, such as a cell phone, when the device is plugged into a source to recharge the battery in the mobile device or it can be performed on a timed periodic basis, etc.

Figure 5:
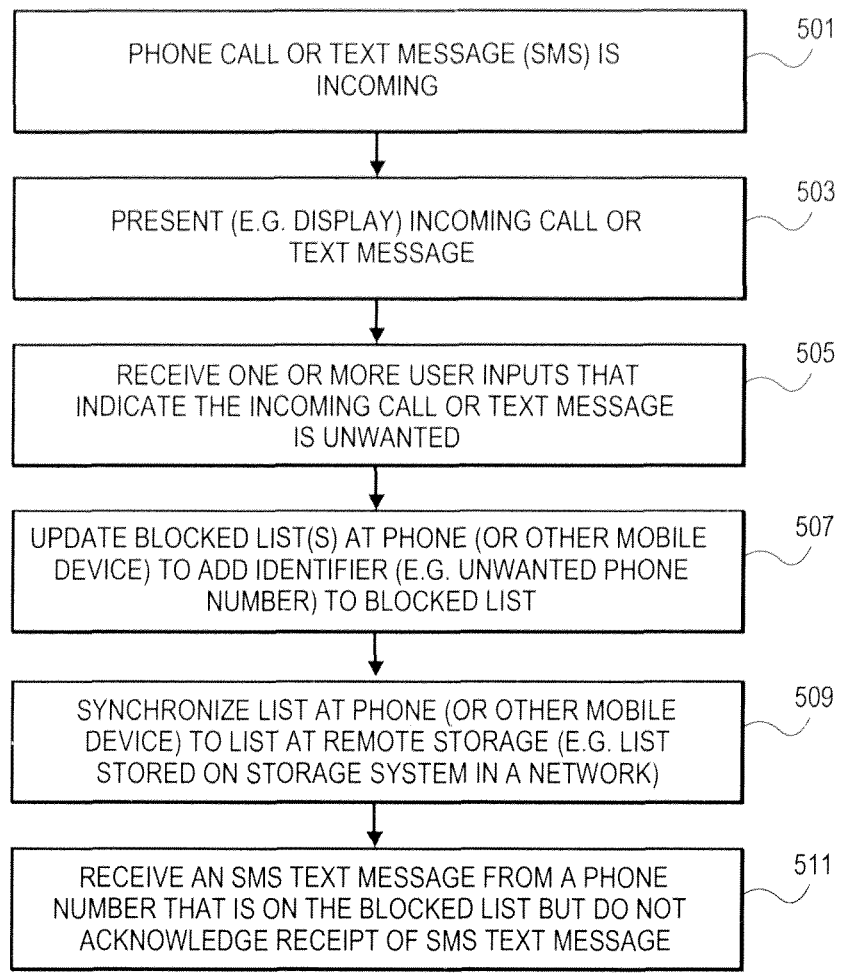
FIG. 5 is a flowchart indicating an example of a method at a mobile device according to one embodiment.

FIG. 5 shows an example of a method which can be implemented by a mobile device, such as mobile device 103 or 107 as shown in FIG. 1. In operation 501, a phone call or text message is processed as an incoming message, and in operation 503, the system displays or otherwise presents the incoming call or text message. In operation 505, the system receives one or more user inputs that indicate that the incoming call or text message is unwanted. This input can occur before the call is accepted or before responding to the text message or it can occur after the incoming call has been accepted or after the text message has been responded to. This input can be, for example, a user's selection of button 215 in FIG. 2A. In operation 507, the one or more blocked lists at the phone, such as local blocked list 105 or local blocked list 109 are updated in operation 507 to add an identifier, such as an unwanted phone number, to one or more blocked lists maintained at the mobile device. Then in operation 509, the local blocked list is synchronized with a remote blocked list at a remote storage. This synchronization can occur periodically in the background or it can occur upon user demand or it can occur when the device is plugged into a charging source, such as an AC voltage source. Then in operation 511, the phone or other mobile device can receive a text message from a phone number or other identifier that is on the blocked local list, but does not acknowledge receipt of the text message in order to circumvent charges from a carrier which attempts to charge a user for all received text messages even though the text message is on the blocked list.

Figure 6:
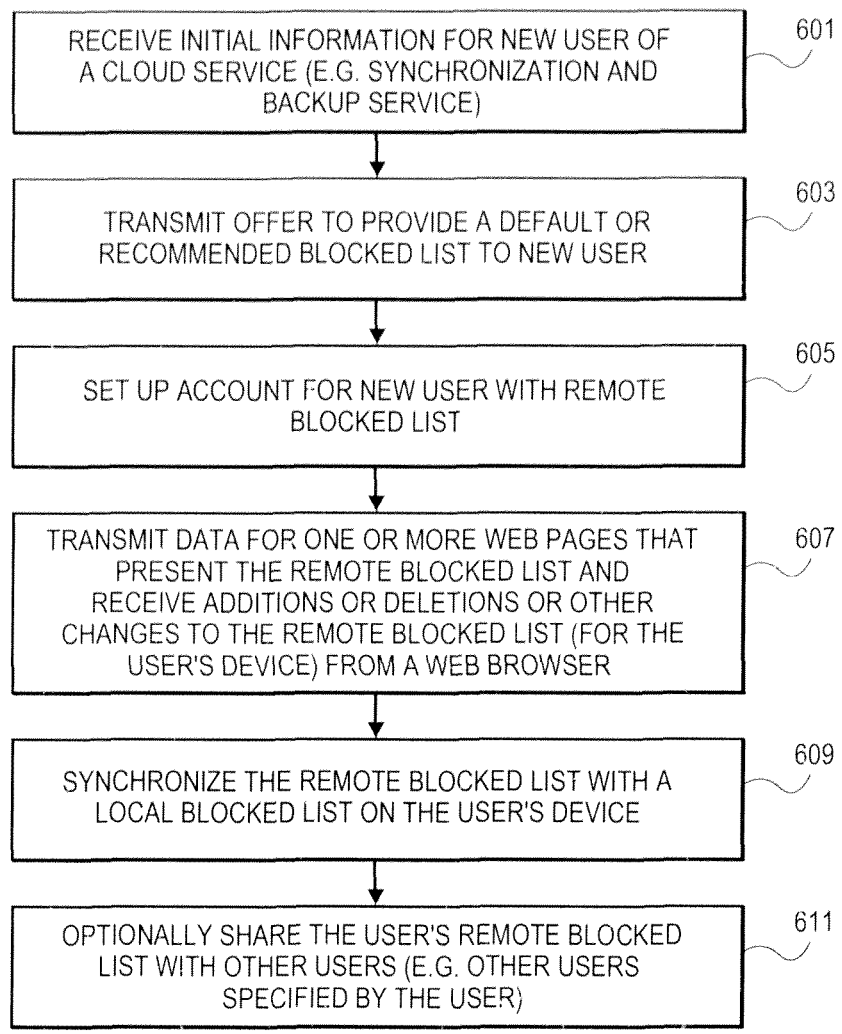
FIG. 6 is a flowchart showing a method according to one embodiment for maintaining a remote blocked list at a storage system in a network.

FIG. 6 shows an example which can be performed by one or more servers, such as server(s) 117, in providing a cloud based synchronization service for a plurality of local blocked lists. In operation 601, a server receives an initial information for a new user of a cloud service, such as a synchronization and backup service. This initialization information can be used to initialize a new account for a new user in order to allow the user to set up a synchronization and backup service. In operation 603, the one or more servers 117 or other servers can transmit an optional offer to provide a default or recommended blocked list to a new user. In one embodiment, the default or recommended blocked list can be dynamically updated based upon a statistical analysis of the most popular blocked callers and/or sources of text messages, and this is described further below. Then in operation 605, the server, such as one of the servers in service servers 117 can set up an account for a new user with a remote blocked list. Next, in operation 607 the server can transmit data for one or more web pages that present the remote blocked list and can receive additions or deletions or other changes to the remote blocked list from a web browser. An example of this interaction has been provided in conjunction with the user interface shown in FIG. 3 in which a user uses a web browser to interact with the remote blocked list to add or otherwise change information in the remote blocked list. Then in operation 609 a synchronization can be performed between the remote blocked list and the local blocked list such that the two lists are synchronized to have the same information between the two lists. The synchronization operation can involve the transmissions, from the user's device, of information beyond the list of unwanted calls and/or text messages, such as information about the device's location when the unwanted calls and/or text messages were received, information about the carrier and the call/SMS type (such as advertisement, fraud, etc.), and this information can be used by the service provider when analyzing the remote blocked lists in the process of creating default or recommended blocked lists. Operation 611 represents an optional operation in which the user's remote blocked list is shared with other users. It will be appreciated that FIGS. 5 and 6 show examples of possible methods and that alternative methods, in alternative embodiments, can use fewer operations or more operations or can use operations in a different sequence than shown.

In one embodiment, one or more service providers (such as a cell phone carrier or a device maker or a content provider) can perform a statistical analysis on data from a plurality of blocked lists (e.g., blocked lists of a large number of users in the same geographic area such as a city or state or country) in order to determine the most popular blocked phone callers or sources of unwanted (e.g., spam) text messages. This statistical analysis can use the synchronized data in the remote blocked lists of a set of users (such as users using their cell phone or other device in the same geographic area), and the analysis can determine the most popular or common blocked callers and/or sources of unwanted text messages (such as the most common blocked callers in a geographic area). The analysis can use any known statistical techniques for identifying the most popular or common set of values (e.g. phone numbers); raw counts, standard deviations, histograms and other known techniques can be used in this analysis. After determining the most popular or common unwanted callers and/or unwanted sources of text messages, the service provider can create a default or recommended blocked list (such as a current default list for a geographic region) and transmit that default or recommended blocked list to new and/or existing users. As users (such as users in a predetermined geographic area) update their local blocked list(s) and as those local blocked list(s) are synchronized over a period of time with their corresponding remote blocked list(s), the remote blocked lists change; the change reflects new sources of unwanted callers or spam text messages and sources who no longer call or send text messages. The service provider (or other entities that maintain the remote blocked lists) can repeatedly update over time (e.g., once a month, once every 2 months, etc.) the default or recommended blocked lists as the set of users update their local blocked lists and as those updated local blocked lists are synchronized with their remote blocked lists. Further statistical analysis can be performed on these synchronized remote blocked lists to provide the updated default or recommended blocked lists. These one or more updated default or recommended blocked lists can be automatically, without user request, be pushed to the set of users (which can be a set of users in a geographic region who have agreed to allow their remote blocked lists to be processed for the purpose of determining the most popular or common blocker callers and/or blocked text messages in order to create the one or more updated blocked lists). In one embodiment, existing users having personalized local blocked lists can also take advantage of the updated default or recommended blocked lists by using both their local blocked list and also using the updated default or recommended blocked list; in this way, the updated default or recommended blocked list supplements each user's personalized local blocked list. In one embodiment, a user can elect between using (a) only the user's personalized local blocked list or (b) only the most recently received default or recommended blocked list or (c) the user's personalized local blocked list(s) and the most recently received default or recommended blocked list.

In one embodiment, one or more service providers can dynamically push, to one or more user's devices, a keywords list of common or frequently occurring words (e.g., "casino coupons") in spam text messages, and this keywords list can be used as a spam filter of text messages by identifying potential spam text messages that contain one or more words in the keywords list. The keywords list can be derived from words occurring in text messages that were identified by the statistical analysis, described herein, used to determine the most popular or common blocked sources of text messages. Latent semantic analysis, or other known techniques, can be used to derive the list of keywords from those text messages; latent semantic analysis can, for example, be used to determine keywords that are more commonly used in spam text messages (from sources of spam text messages determined from the statistical analysis) than in non-spam text messages. In one embodiment, a user's device can use the keywords list by using conventional spam filtering techniques to identify spam text messages that are not from sources in the local blocked list of blocked text messagers. In one embodiment, the keywords list can be user customizable by allowing each user to view and edit the user's keywords list through a web browser (for example, as through a web browser interface that is similar to the interface shown in FIG. 3).

Figure 7:
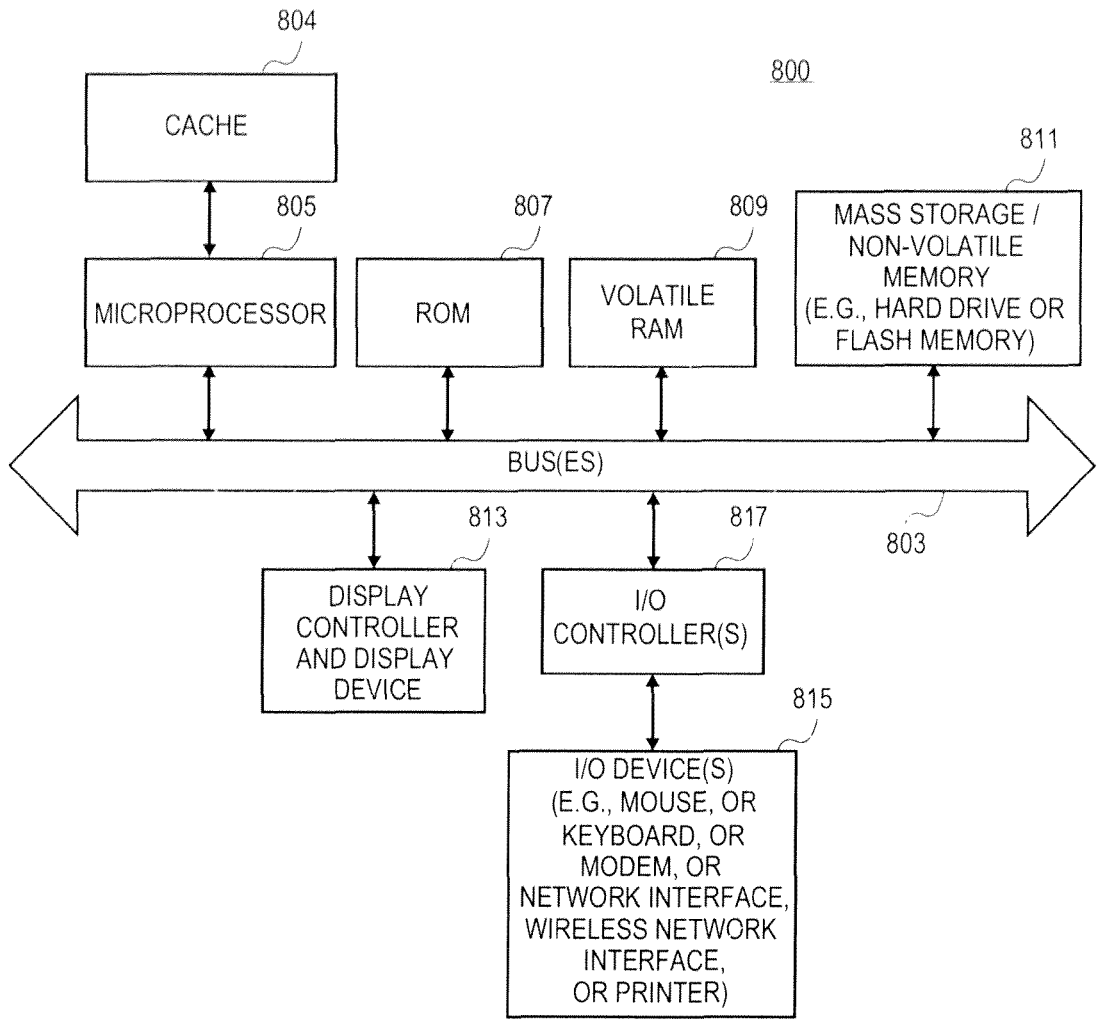
FIG. 7 shows an example of a data processing system which may be used with one embodiment.

FIG. 7 shows one example of a data processing system, which may be used with any one of the embodiments described herein. Note that while FIG. 7 illustrates various components of a data processing system, it is not intended to represent any particular architecture or manner of interconnecting the components as such details are not germane to this description. It will also be appreciated that network computers, tablet computers, and other data processing systems which have fewer components or perhaps more components may also be used with one or more embodiments described herein.

As shown in FIG. 7, the computer system 800, which is a form of a data processing system, includes a bus 803 which is coupled to one or more microprocessor(s) 805 and a ROM (Read Only Memory) 807 and volatile RAM 809 and a non-volatile memory 811. The microprocessor 805 is coupled to optional cache 804. The microprocessor 805 may retrieve the stored instructions from one or more of the memories 807, 809 and 811 and execute the instructions to perform operations described above. These memories represent examples of machine readable non-transitory storage media that can store or contain computer program instructions which when executed cause a data processing system to perform the one or more methods described herein. The bus 803 interconnects these various components together and also interconnects these components 805, 807, 809 and 811 to a display controller and display device 813 and to peripheral devices such as input/output (I/O) devices 815 which may be one or more of mice, touch screens, touch pads, touch sensitive input devices, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory. The system 800 can be the one or more servers (such as server(s) 117 in FIG. 1) which provide the cloud based backup and synchronization services for the various mobile devices (such as mobile devices 103 and 107 in FIG. 1) and these services can store content and contacts and other user information and also store a personalized local blocked list at each mobile device. The system 800 can also be used to act as one or more web servers that provide web pages, such as the web page shown in FIG. 3, to a web browser running on a system, such as systems 102 and 104 in FIG. 1. The systems 102 and 104 can be implemented in the form of system 800; systems 102 and 104 can be desktop or laptop computers or tablet computer systems such as an iPad.

The mass storage 811 is typically a magnetic hard drive or a magnetic optical drive or an optical drive or a DVD RAM or a flash memory or other types of memory system which maintain data (e.g., large amounts of data) even after power is removed from the system. Typically the mass storage 811 will also be a random access memory although this is not required. While FIG. 7 shows that the mass storage 811 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Figure 8:
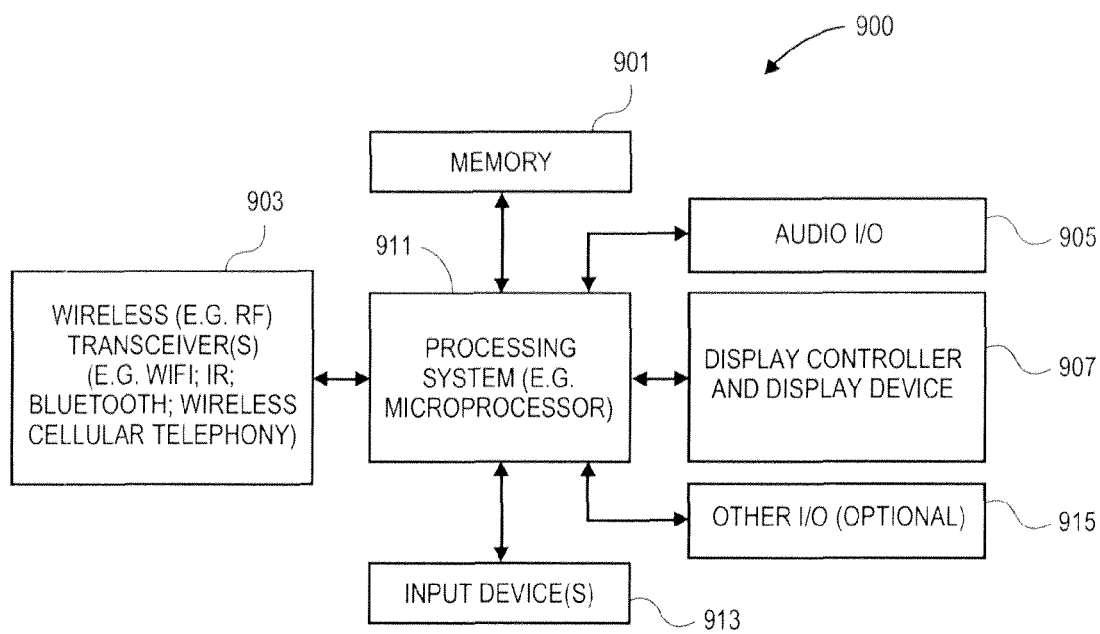
FIG. 8 is an example of another data processing system which may also be used with one embodiment.

FIG. 8 shows an example of another data processing system which may be used with one or more embodiments described herein. The data processing system 900 shown in FIG. 8 includes a processing system 911, which may be one or more microprocessors, or which may be a system on a chip (integrated circuit), and the system also includes memory 901 for storing data and programs for execution by the processing system. Memory 901 can be one or more forms of machine readable non-transitory storage media for storing computer program instructions which when executed by system 900 cause system 900 to perform the one or more methods described herein. For example, memory 901 can be DRAM or Flash memory or other forms of volatile or non-volatile semiconductor memory or other forms of memory. The system 900 can be used, in one embodiment, to implement mobile devices 103 and 107 and can also be used to implement systems 102 and 104. The system 900 also includes audio input/output subsystem 905 which may include a microphone and a speaker for, for example, playing back music or providing telephone functionality through the speaker and microphone.

A display controller and display device 907 provide a visual user interface for the user; this digital interface may include a graphical user interface which is similar to that shown on an iPhone or iPad when running iOS operating system software. The system 900 also includes one or more wireless transceivers 903. A wireless transceiver may be a WiFi transceiver, an infrared transceiver, a Bluetooth transceiver, and/or a wireless cellular telephony transceiver or a combination of a set of such transceivers. It will be appreciated that additional components, not shown, may also be part of the system 900 in certain embodiments, and in certain embodiments fewer components than shown in FIG. 8 may also be used in a data processing system.

The data processing system 900 also includes one or more input devices 913 which are provided to allow a user to provide input to the system. These input devices may be a keypad or a keyboard or a touch panel or a multi touch input panel. The data processing system 900 also includes an optional input/output device 915 which may be a connector for a dock. It will be appreciated that one or more buses, not shown, may be used to interconnect the various components as is well known in the art. The data processing system shown in FIG. 8 may be a handheld computer, or a tablet computer such as an iPad or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 900 may be a network computer or an embedded processing device within another device, or a consumer electronic device or other types of data processing systems which have fewer components or perhaps more components than that shown in FIG. 8.

In the foregoing specification, specific exemplary embodiments have been described. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A machine implemented method comprising:
   receiving, at a device, one or more inputs from a user, each of the inputs indicating that the user does not want to receive a communication which is one of (a) a phone call or (b) a text, short message service (SMS), message;
   in response to the inputs, adding identifiers to a local blocked list stored at the device, the local blocked list being personalized by the end user and the identifier specifying one or more phone numbers to be blocked;
   synchronizing the local blocked list stored at the device with a remote blocked list for the user stored at a remote storage in a network, the synchronizing comprising transmitting items on the local blocked list, including the identifiers corresponding to the inputs to the remote storage;
   upon subsequently receiving an other phone call or an other text (SMS) message, comparing one or more identifiers from the other phone call or the other text (SMS) to the local blocked list to determine whether the one or more identifiers appear in the local blocked list; and
   when the one or more identifiers appear in the local blocked list, blocking the other phone call or text (SMS) at the device, the blocking comprising preventing an indication of the other phone call or other text (SMS) from being presented by the device, wherein the blocking further comprises, for the other text (SMS) message, suppressing an acknowledge receipt to the SMS network of the text (SMS) message;
   wherein the remote blocked list is viewable and editable through a web browser on another device.

2. The method as in claim 1 wherein the synchronizing also comprises receiving changes for the local blocked list from the remote blocked list.

3. The method as in claim 2 wherein the changes comprise identifiers not in the local blocked list.

4. The method as in claim 2 wherein the local blocked list cannot be viewed, as a list of a plurality of phone numbers, at the device except through a web browser which obtains the list of a plurality of phone numbers from a web server.

5. The method as in claim 1, the method further comprising:
   synchronizing the remote blocked list of the user with an additional local blocked list of the user stored on an additional device of the user, the additional local blocked list having identifiers that specify one or more phone numbers to be blocked at the additional device of the user.

6. The method as in claim 5, wherein the additional device is a new device for the user which replaces the device.

7. The method as in claim 1, the method further comprising:
   sharing, through an authorization by the user, the remote blocked list of the user with other users.

8. The method as in claim 1, the method further comprising:
   synchronizing the user's contacts and media content with the remote storage which acts as a backup storage of the user's contacts and media content.

9. A machine readable non-transitory storage medium containing executable instructions which when executed by a data processing system cause the system to perform a method comprising:
   storing a remote blocked list at a storage system in a network, the remote blocked list being personalized by a user of a device through one or more inputs from the user at the device, each of the inputs indicating that the user does not want to receive a communication which is one of (a) a phone call or (b) a text, short message service (SMS), message;
   synchronizing, at the storage system, the remote blocked list at the storage system with a local blocked list stored at the device, the synchronizing comprising receiving, from the device, identifiers that specify one or more phone numbers to be blocked; and
   presenting, via a web interface, the remote blocked list to an other device, the presenting comprising sending the remote blocked list to the other device in a form that is viewable and editable using a web browser on the other device.

10. The medium as in claim 9, the method further comprising:
synchronizing the remote blocked list of the user with an additional local blocked list of the user stored on an additional device of the user, the additional local blocked list having identifiers that specify one or more phone numbers to be blocked at the additional device of the user, the synchronizing comprising receiving data from the additional device; and wherein the additional device is a new device for the user which replaces the device.

11. The medium as in claim 9, the method further comprising:
sharing, through an authorization by the user, the remote blocked list of the user with other users.

12. The medium as in claim 9, the method further comprising:
synchronizing the user's contacts and media content with the storage system which acts as a backup storage of the user's contacts and media content.

13. A machine readable non-transitory storage medium containing executable instructions which, when executed by a device cause the device to perform a method comprising:
receiving, at an input device of a device, one or more inputs from a user, each of the inputs indicating that the user does not want to receive a communication which is one of (a) a phone call or (b) a text, short message service (SMS), message;
adding, in response to the inputs, identifiers to a local blocked list stored at the device, the local blocked list being personalized by the end user and the identifier specifying one or more phone numbers to be blocked;
synchronizing the local blocked list stored at the device with a remote blocked list for the user stored at a remote storage in a network, the synchronizing comprising transmitting items on the local blocked list, including the identifiers corresponding to the inputs to the remote storage;
upon subsequently receiving an other phone call or an other text (SMS) message, comparing one or more identifiers from the other phone call or the other text (SMS) to the local blocked list to determine whether the one or more identifiers appear in the local blocked list; and
when the one or more identifiers appear in the local blocked list, blocking the other phone call or text (SMS) at the device, the blocking comprising preventing an indication of the other phone call or other text (SMS) from being presented by the device, wherein the blocking further comprises, for the other text (SMS) message, suppressing an acknowledge receipt to the SMS network of the text (SMS) message;
wherein the remote blocked list is viewable and editable through a web browser on another device.

14. A data processing system comprising:
a storage system;
a network interface configured to receive data from and transmit data to a network; and
a processing system coupled to the storage system and to the network interface;
the storage system configured to store a remote blocked list which is personalized by a user of a device through one or more inputs from the user at the device, each of the inputs indicating that the user does not want to receive a communication which is one of (a) phone call or (b) a text, short message service (SMS), message;
the processing system configured to synchronize, at the storage system, the remote blocked list with a local blocked list stored at the device by receiving, from the device, identifiers that specify one or more phone numbers to be blocked; and
the processing system further configured to present, via a web interface, the remote blocked list to an other device, the presenting comprising sending the remote blocked list to the other device in a form that is viewable and editable using a web browser on the other device.

15. The data processing system as in claim 14, wherein the processing system is configured to synchronize the remote blocked list with an additional local blocked list of the user stored on an additional device of the user, the additional local blocked list having identifiers that specify one or more phone numbers to be blocked at the additional device of the user; and wherein the additional device is a new device for the user which replaces the device.

16. The data processing system as in claim 14, wherein the processing system is configured to synchronize the user's contacts and content with the storage system's copy of the user's contacts and content, and wherein the storage system acts as a backup storage of the user's contacts and content.

17. The data processing system as in claim 14 wherein the processing system is configured to synchronize a plurality of remote blocked lists for a corresponding plurality of users in a geographic region and is configured to perform a statistical analysis on the plurality of remote blocked lists to create a default or recommended local blocked list for transmission to new users.

* * * * *